(12) United States Patent
Okada et al.

(10) Patent No.: US 11,145,041 B2
(45) Date of Patent: Oct. 12, 2021

(54) IMAGE PROCESSING DEVICE AND METHOD PREDICTING AREAS IN WHICH TO SEARCH FOR PARKING SPACE DELIMITING LINES

(71) Applicant: DENSO TEN Limited, Kobe (JP)

(72) Inventors: Yasutaka Okada, Kobe (JP); Hiroaki Sano, Kobe (JP); Tetsuo Yamamoto, Kobe (JP); Atsushi Yoshihara, Kobe (JP); Jun Kanetake, Kawasaki (JP); Ryo Yoshimura, Fukuoka (JP); Tomoki Shidori, Kobe (JP)

(73) Assignee: DENSO TEN Limited, Kobe (JP)

( * ) Notice: Subject to any disclaimer, the term of this patent is extended or adjusted under 35 U.S.C. 154(b) by 109 days.

(21) Appl. No.: 16/574,516

(22) Filed: Sep. 18, 2019

(65) Prior Publication Data

US 2020/0193579 A1 Jun. 18, 2020

(30) Foreign Application Priority Data

Dec. 14, 2018 (JP) .............................. JP2018-234807

(51) Int. Cl.
*G06T 5/50* (2006.01)
*G06T 1/60* (2006.01)
*G06T 1/20* (2006.01)

(52) U.S. Cl.
CPC ................. *G06T 5/50* (2013.01); *G06T 1/20* (2013.01); *G06T 1/60* (2013.01); *B60R 2300/8093* (2013.01); *G06T 2207/20004* (2013.01)

(58) Field of Classification Search
CPC .... G06T 5/50; G06T 1/60; G06T 1/20; G06T 2207/20004; G06T 7/73; G06T 2207/10016; G06T 2207/30264; G06T 7/246; B60R 2300/8093; G06K 9/00812; G06K 9/00798; B62D 15/0285
See application file for complete search history.

(56) References Cited

U.S. PATENT DOCUMENTS

| 9,361,529 B2 | 6/2016 | Ryu et al. |
| 9,536,155 B2 | 1/2017 | Takemae |
| 9,721,460 B2 | 8/2017 | Takemura et al. |

(Continued)

FOREIGN PATENT DOCUMENTS

| CN | 203318408 U | 12/2013 |
| GN | 102834309 B | 12/2016 |

(Continued)

OTHER PUBLICATIONS

U.S. Appl. No. 16/574,395, filed Sep. 18, 2019 in the name of Yasutaka Okada et al.

(Continued)

*Primary Examiner* — Ming Y Hon
(74) *Attorney, Agent, or Firm* — Oliff PLC

(57) ABSTRACT

An image processing device includes: a setting unit configured to set an area, as a first area, in which at least one delimiting line for delimiting a parking space is detected in a first image of plural images continuously captured while moving; and a prediction unit configured to predict, based on the first area, a second area in which the at least one delimiting line is to be detected in at least one second image of the plural images, the at least one second image being captured later in time than the first image.

16 Claims, 6 Drawing Sheets

(56) References Cited

U.S. PATENT DOCUMENTS

| | | |
|---|---|---|
| 10,311,731 B1 | 6/2019 | Li et al. |
| 10,373,226 B1 | 8/2019 | Russell et al. |
| 2002/0087253 A1 | 7/2002 | Jeon |
| 2003/0128106 A1* | 7/2003 | Ross .............. G01S 17/88 340/435 |
| 2003/0222983 A1 | 12/2003 | Nobori et al. |
| 2004/0254720 A1 | 12/2004 | Tanaka et al. |
| 2006/0080035 A1 | 4/2006 | Daubert et al. |
| 2008/0109120 A1* | 5/2008 | Sawamoto .......... B60W 30/17 701/1 |
| 2009/0243889 A1 | 10/2009 | Suhr et al. |
| 2009/0278709 A1 | 11/2009 | Endo et al. |
| 2010/0049402 A1* | 2/2010 | Tanaka .............. B60R 1/00 701/41 |
| 2010/0195901 A1 | 8/2010 | Andrus et al. |
| 2010/0318467 A1* | 12/2010 | Porter ............. H04N 5/2624 705/51 |
| 2011/0006917 A1* | 1/2011 | Taniguchi ............ G06T 7/73 340/932.2 |
| 2013/0027557 A1 | 1/2013 | Hirai et al. |
| 2013/0266188 A1* | 10/2013 | Bulan ............. G06K 9/00771 382/104 |
| 2014/0355822 A1 | 12/2014 | Choi et al. |
| 2015/0130640 A1* | 5/2015 | Ryu .............. G06K 9/00812 340/932.2 |
| 2015/0254981 A1 | 9/2015 | Tachibana et al. |
| 2015/0294163 A1 | 10/2015 | Sakamoto |
| 2015/0317526 A1 | 11/2015 | Muramatsu et al. |
| 2015/0344028 A1 | 12/2015 | Gieseke et al. |
| 2016/0039409 A1 | 2/2016 | Hayakawa et al. |
| 2016/0093214 A1 | 3/2016 | Wu et al. |
| 2016/0107689 A1* | 4/2016 | Lee .............. B62D 15/0285 382/104 |
| 2016/0272244 A1 | 9/2016 | Imai et al. |
| 2016/0304088 A1 | 10/2016 | Barth |
| 2017/0085790 A1 | 3/2017 | Bohn |
| 2018/0012082 A1* | 1/2018 | Satazoda ........... G06K 9/00805 |
| 2018/0095474 A1* | 4/2018 | Batu ............... G01S 19/48 |
| 2018/0099661 A1 | 4/2018 | Bae et al. |
| 2018/0162446 A1* | 6/2018 | Mikuriya ........... B62D 15/024 |
| 2018/0215413 A1 | 8/2018 | Inagaki |
| 2018/0307919 A1 | 10/2018 | Hayakawa |
| 2018/0307922 A1 | 10/2018 | Yoon et al. |
| 2018/0345955 A1 | 12/2018 | Kim et al. |
| 2019/0073902 A1 | 3/2019 | Indoh et al. |
| 2019/0075255 A1 | 3/2019 | Matsumoto et al. |
| 2019/0094871 A1 | 3/2019 | Sugano |
| 2019/0370572 A1 | 12/2019 | Nagpal et al. |
| 2020/0062242 A1 | 2/2020 | Hayakawa |
| 2020/0074192 A1 | 3/2020 | Ogata et al. |
| 2020/0104613 A1 | 4/2020 | Hirai |
| 2020/0117927 A1* | 4/2020 | Oba ............... G06K 9/00812 |
| 2020/0118310 A1 | 4/2020 | Matsumoto et al. |
| 2020/0175634 A1 | 6/2020 | Aggarwala et al. |
| 2020/0193643 A1 | 6/2020 | Hess et al. |
| 2020/0398827 A1* | 12/2020 | Hara ............... B60W 50/14 |
| 2021/0180954 A1 | 6/2021 | Hiyokawa et al. |

FOREIGN PATENT DOCUMENTS

| | | | |
|---|---|---|---|
| JP | 2003-032669 A | 1/2003 | |
| JP | 2005-300294 A | 10/2005 | |
| JP | 2009-288867 A | 12/2009 | |
| JP | 2012-176641 A | 9/2012 | |
| JP | 2012-221375 A | 11/2012 | |
| JP | 2013-001366 A | 1/2013 | |
| JP | 2014-106731 A | 6/2014 | |
| JP | 2014-146182 A | 8/2014 | |
| JP | 2015-104982 A | 6/2015 | |
| JP | 2015-185138 A | 10/2015 | |
| JP | 2015219774 A | 12/2015 | |
| JP | 2017-021747 A | 1/2017 | |
| JP | 2017-076275 A | 4/2017 | |
| JP | 2017-087758 A | 5/2017 | |
| JP | 2018-136695 A | 8/2018 | |
| JP | 2018-180941 A | 11/2018 | |
| KR | 20170102192 A | 9/2017 | |
| WO | 03058163 A1 | 7/2003 | |
| WO | 2005/081941 A2 | 9/2005 | |
| WO | 2010116922 A1 | 10/2010 | |
| WO | 2014/084118 A1 | 6/2014 | |
| WO | 2017/068699 A1 | 4/2017 | |

OTHER PUBLICATIONS

U.S. Appl. No. 16/574,507, filed Sep. 18, 2019 in the name of Yasutaka Okada et al.
U.S. Appl. No. 16/574,462, filed Sep. 18, 2019 in the name of Yasutaka Okada et al.
U.S. Appl. No. 16/574,422, filed Sep. 18, 2019 in the name of Yasutaka Okada et al.
U.S. Appl. No. 16/574,598, filed Sep. 18, 2019 in the name of Yasutaka Okada et al.
U.S. Appl. No. 16/574,503, filed Sep. 18, 2019 in the name of Yasutaka Okada et al.
U.S. Appl. No. 16/574,499, filed Sep. 18, 2019 in the name of Yasutaka Okada et al.
U.S. Appl. No. 16/574,529, filed Sep. 18, 2019 in the name of Yasutaka Okada et al.
U.S. Appl. No. 16/574,546, filed Sep. 18, 2019 in the name of Yasutaka Okada et al.
U.S. Appl. No. 16/574,393, filed Sep. 18, 2019 in the name of Yasutaka Okada et al.
U.S. Appl. No. 16/574,391, filed Sep. 18, 2019 in the name of Yasutaka Okada et al.
U.S. Appl. No. 16/574,450, filed Sep. 18, 2019 in the name of Yasutaka Okada et al.
Sep. 29, 2020 U.S. Office Action issued U.S. Appl. No. 16/574,391.
Nov. 23, 2020 Office Action issued in U.S. Appl. No. 16/574,462.
K Choeychuen, "Available car parking space detection from webcam by using adaptive mixing features," 2012 Ninth International Joint Conference on Computer Science and Software Engineering (JCSSE) (Year: 2012).
Nov. 30, 2020 Office Action issued in U.S. Appl. No. 16/574,503.
Suhr et al., "Automatic Parking Space Detection and Tracking for Underground and Indoor Environments" IEEE Transactions on Industrial Electronics. (Year: 2016).
K Hamada et al., "Surround View Based Parking Lot Detection and Tracking." IEEE Intelligent Vehicles Symposium (Year 2015) pp. 1106-1111.
Dec. 3, 2020 Office Action issued in U.S. Appl. No. 16/574,393.
J Suhr et al., "A Universal Vacant Parking Slot Recognition System Using Sensors Mounted on Off-the-Shelf Vehicles." (Year: 2018).
Reinhard et al.. Photographic Tone Reproduction for Digital Images (2002), ACM Transactions on Graphics, 2,4, 217-236 (Year: 2002).
Feb. 2, 2021 Office Action issued in U.S. Appl. No. 16/574,422.
Aug. 3, 2020 Office Action issued in U.S. Appl. No. 16/574,598.
Jun. 30, 2020 Notice of Allowance Issued in U.S. Appl. No. 16/574,546.
May 19, 2021 Office Action issued in U.S. Appl. No. 16/574,395.
May 12, 2021 Notice of Allowance issued in U.S. Appl. No. 16/574,422.
Mar. 19, 2021 Office Action issued in U.S. Appl. No. 16/574,462.
Mar. 19, 2021 Office Action issued in U.S. Appl. No. 16/574,503.
Mar. 25, 2021 Office Action issued in U.S. Appl. No. 16/574,391.
Apr. 9, 2021 Office Action issued in U.S. Appl. No. 16/574,393.
Apr. 6, 2021 Office Action issued in U.S. Appl. No. 16/574,507.
Jul. 20, 2021 Notice of Allowance issued in U.S. Appl. No. 16/574,507.

\* cited by examiner

IMAGE PROCESSING DEVICE AND METHOD PREDICTING AREAS IN WHICH TO SEARCH FOR PARKING SPACE DELIMITING LINES

CROSS-REFERENCE TO RELATED APPLICATIONS

This application is based upon and claims the benefit of priority from prior Japanese patent application No. 2018-234807, filed on Dec. 14, 2018, the entire contents of which are incorporated herein by reference.

BACKGROUND

Technical Field

The present disclosure relates to an image processing device and an image processing method.

Related Art

In recent years, as automatic driving technology is developed, an image processing device configured to detect a parking space for parking a vehicle from image data obtained by capturing a surrounding of the vehicle is spread. In the image processing device, delimiting lines for delimiting the parking space are detected from the captured data, and the parking space is detected on the basis of the detected delimiting lines (for example, see JP-A-2017-87758).

When the vehicle having a camera configured to capture an image moves in a parking lot, it is necessary for the image processing device to detect a parking space by detecting the delimiting lines from each of a plurality of images to be continuously captured while moving.

SUMMARY

However, in the related art, for example, when detecting the delimiting lines while searching an entire area in each of the plurality of images to be continuously captured, processing time required to detect the delimiting lines is prolonged.

An aspect of an exemplary embodiment has been made in view of the above situation, and an object thereof is to provide an image processing device and an image processing method capable of shortening processing time required to detect delimiting lines while maintaining detection accuracy of the delimiting lines to be detected from each of a plurality of images to be continuously captured.

According to an aspect of the present disclosure, there is provided an image processing device including: a setting unit configured to set an area, as a first area, in which at least one delimiting line for delimiting a parking space is detected in a first image of plural images continuously captured while moving; and a prediction unit configured to predict, based on the first area, a second area in which the at least one delimiting line is to be detected in at least one second image of the plural images, the at least one second image being captured later in time than the first image.

The image processing device and the image processing method according to an aspect of the exemplary embodiment may shorten processing time required to detect the delimiting lines while maintaining detection accuracy of the delimiting lines to be detected from each of the plurality of images to be continuously captured.

BRIEF DESCRIPTION OF DRAWINGS

Exemplary embodiment(s) of the present invention will be described in detail based on the following figures, wherein.

DETAILED DESCRIPTION

Hereinbelow, an image processing device and an image processing method according to an exemplary embodiment will be described in detail with reference to the accompanying drawings. In the meantime, the present disclosure is not limited to the exemplary embodiment.

Figure 1A:
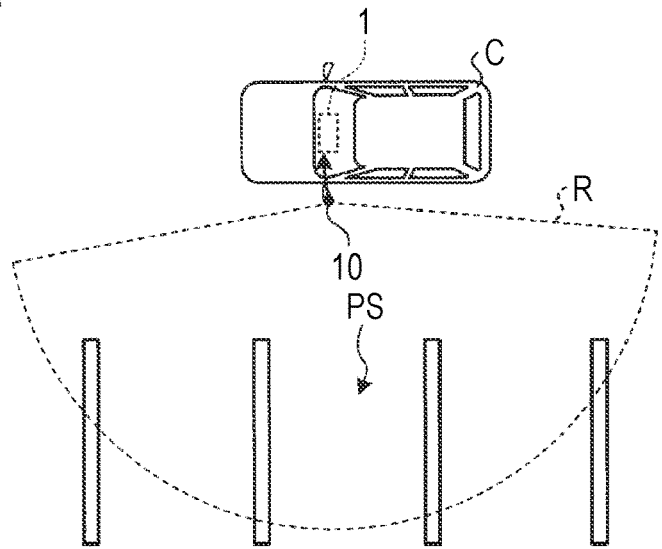
FIG. 1A depicts an example in which an image processing device according to an exemplary embodiment is mounted.
Figure 1B:
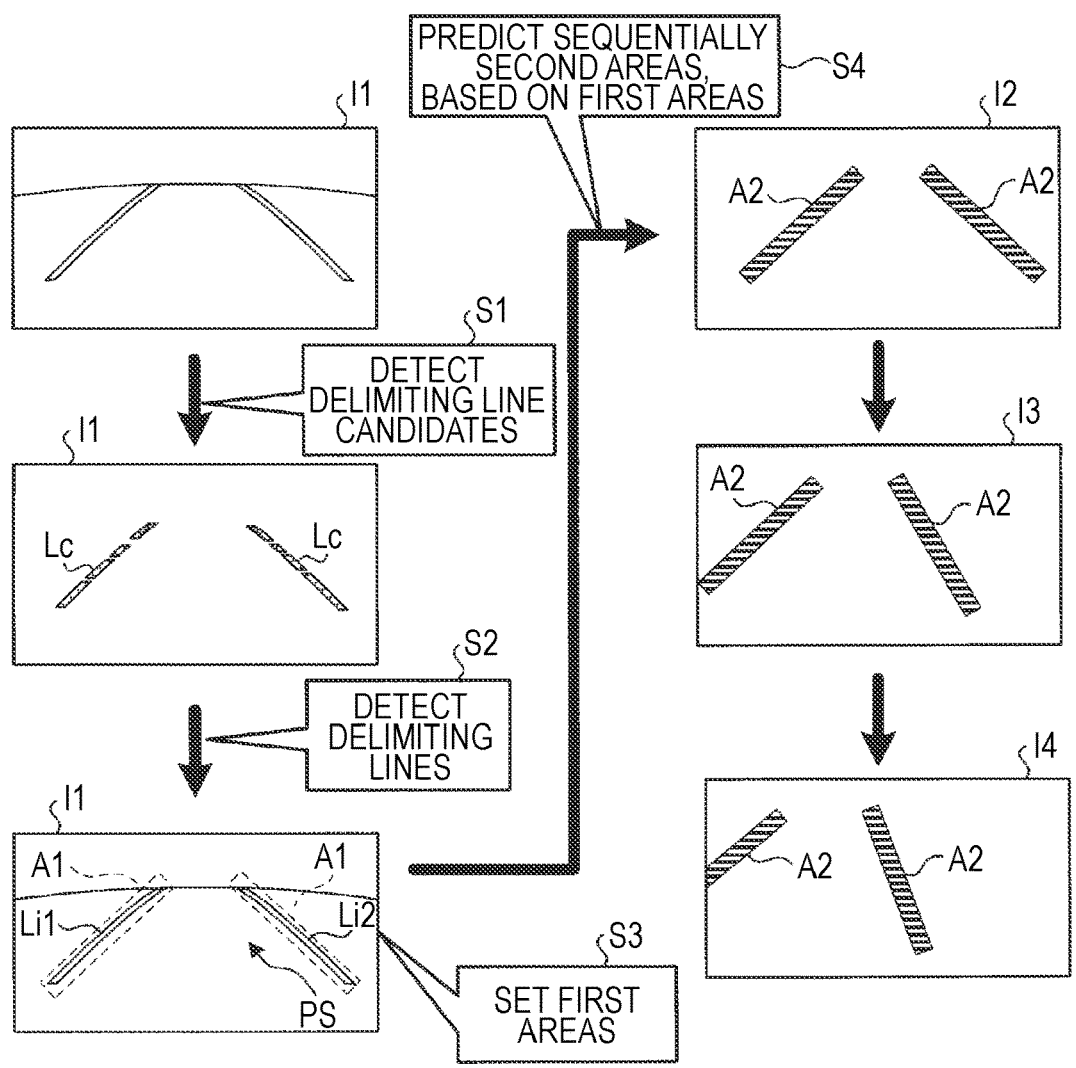
FIG. 1B depicts an outline of an image processing method according to the exemplary embodiment.

First, an outline of an image processing device according to an exemplary embodiment is described with reference to FIGS. 1A and 1B. FIG. 1A depicts an example in which an image processing device is mounted. Also, FIG. 1B depicts an outline of an image processing method. The image processing method is executed by the image processing device 1 shown in FIG. 1A.

As shown in FIG. 1A, the image processing device 1 according to the exemplary embodiment is mounted on a host vehicle C (hereinbelow, referred to as 'vehicle C') having a vehicle-mounted camera 10 mounted thereto, and is configured to detect parking spaces PS from a captured image (hereinbelow, simply referred to as 'image') captured by the vehicle-mounted camera 10.

The vehicle-mounted camera 10 is a monocular image device including an imaging element such as a CCD (Charge Coupled Device), a CMOS (Complementary Metal Oxide Semiconductor) and the like, for example, and configured to capture a surrounding of the vehicle C. Also, for a lens of the vehicle-mounted camera 10, a wide-angle lens such as a fish-eye lens is adopted, for example. Thereby, the vehicle-mounted camera 10 can capture parking spaces PS existing in an imaging area R of a wide angle, as shown in FIG. 1A. Meanwhile, in the example of FIG. 1A, the vehicle-mounted camera 10 is a left side camera configured to capture a left side of the vehicle C. However, the vehicle-mounted camera 10 includes a front camera configured to capture a front of the vehicle C, a rear camera configured to capture a rear of the vehicle C, and a right side camera configured to capture a right side of the vehicle C.

When detecting the parking spaces PS, the image processing device 1 first detects delimiting line candidates, which are candidates of a delimiting line L for delimiting each parking space PS, from the image and detects each of the parking spaces PS on the basis of the detected delimiting line candidates. At this time, for example, when the delimiting line candidates are discretely detected or discontinuously detected, the parking space PS may not be detected.

Therefore, the image processing device 1 according to the exemplary embodiment is configured to integrate the detected delimiting line candidates, based on a predetermined integration condition. Thereby, the image processing device 1 according to the exemplary embodiment can improve detection accuracy of the parking space PS.

Specifically, as shown in FIG. 1B, the image processing device 1 first detects delimiting line candidates Lc from a first image I1 (step S1). For example, the image processing device 1 detects the delimiting line candidates Lc, based on edge lines connecting edge points obtained by performing edge emphasizing for the first image I1.

Then, the image processing device 1 detects, as the delimiting line candidate Lc, edge lines corresponding to boundaries between the delimiting line and a road surface in the first image I1. That is, the delimiting line candidate Lc is a pair of edge lines corresponding to left and right ends of the delimiting line in a width direction.

Then, the image processing device 1 integrates the delimiting line candidates Lc detected in step S1, based on a predetermined integration condition, and detects delimiting lines Li1 and Li2 (step S2). Thereby, the image processing device 1 can detect, as the parking space PS, an area between the pair of delimiting lines Li1 and Li2.

The image processing device 1 can calculate positions and angles of the delimiting lines Li1 and Li2 with respect to the moving vehicle C by detecting the delimiting lines Li1 and Li2 appearing in each image from a plurality of images to be continuously captured while moving.

At this time, when the image processing device 1 searches an entire area of each image and detects the delimiting lines Li1 and Li2, processing time required to detect the delimiting lines Li1 and Li2 is prolonged. Therefore, when the delimiting lines Li1 and Li2 are detected, the image processing device 1 executes processing of detecting the delimiting lines Li1 and Li2 only within areas, in which the delimiting lines Li1 and Li2 are highly likely to appear, of an entire area of each image, for images to be sequentially captured thereafter.

Specifically, when the delimiting lines Li1 and Li2 are detected from the first image I1 shown in FIG. 1B of the plurality of images to be continuously captured while moving, the image processing device 1 sets areas in which the delimiting lines Li1 and Li2 are detected, as first areas A1 (step S3).

Thereafter, the image processing device 1 sequentially predicts second areas A2, in which the delimiting lines Li1 and Li2 are highly likely to appear, in a plurality of second images 12, 13, 14 to be continuously captured sequentially later in time than the first image I1, based on the first areas A1 (step S4).

At this time, the image processing device 1 sequentially predicts the second areas A2, based on positions of the first areas A1 in the first image I1, a shutter speed of the vehicle-mounted camera 10, a moving speed of the vehicle C, and the like, for example. Then, the image processing device 1 selectively performs edge emphasizing for the second areas A2 of an entire area of each of the second images 12, 13, 14 without performing edge emphasizing for an area except the second areas A2, and detects the delimiting line candidates Lc to detect the delimiting lines Li1 and Li2.

Thereby, the image processing device 1 can shorten the processing time required to detect the delimiting lines Li1 and Li2 while maintaining the detection accuracy of the delimiting lines Li1 and Li2, as compared to a configuration of detecting the delimiting lines Li1 and Li2 while searching the entire area of each of the second images 12, 13, 14. In the meantime, a setting sequence of the first area A1 will be described later with reference to FIGS. 4A and 4B, and a prediction sequence of the second area A2 will be described with reference to FIG. 5.

Figure 2:
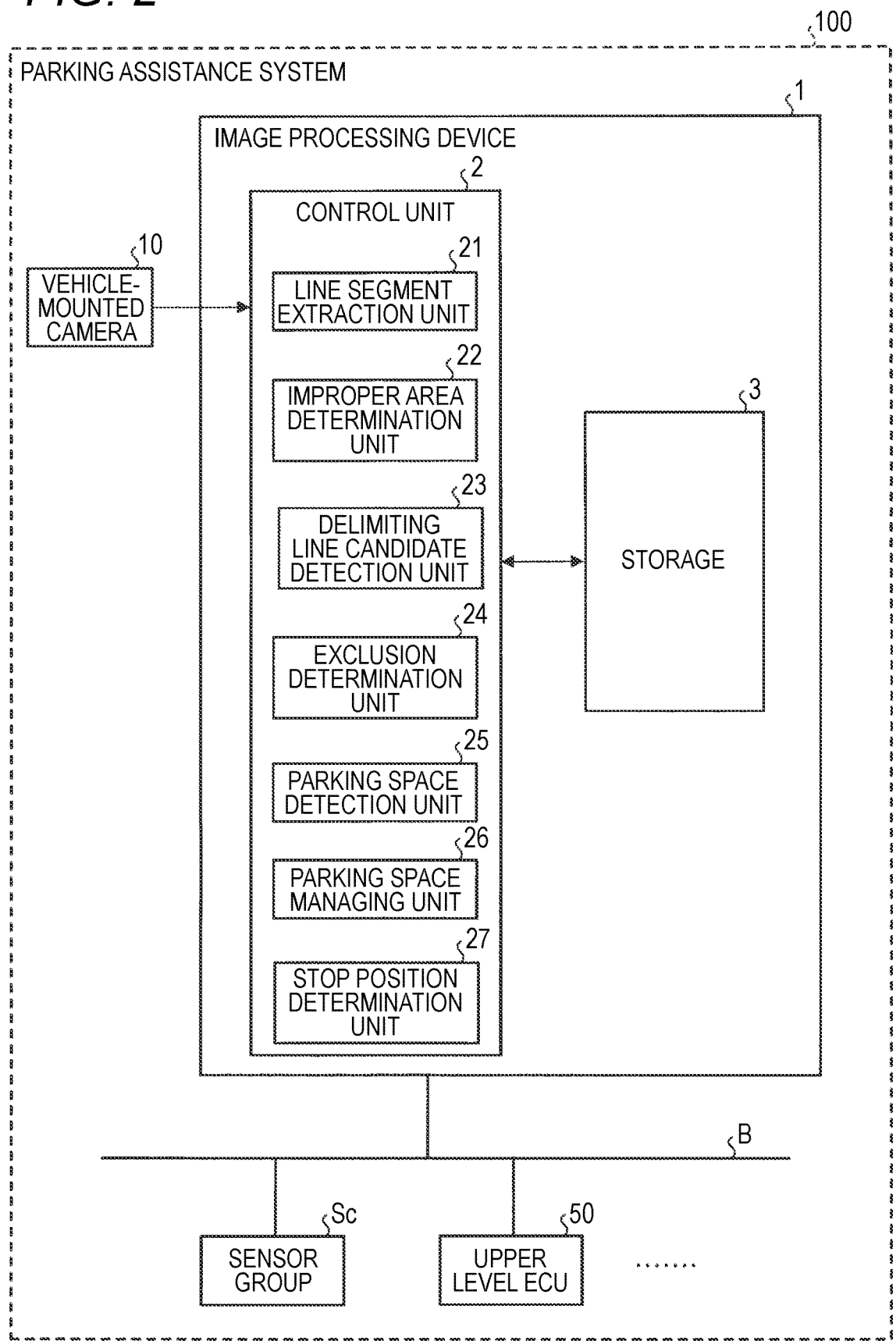
FIG. 2 is a block diagram depicting a configuration of a parking assistance system according to the exemplary embodiment.

Subsequently, a configuration example of the image processing device 1 according to the exemplary embodiment is described with reference to FIG. 2. FIG. 2 is a block diagram of the image processing device 1. In the meantime, FIG. 2 depicts a parking assistance system 100 including the image processing device 1.

As shown in FIG. 2, the parking assistance system 100 includes the image processing device 1, the vehicle-mounted camera 10, a sensor group Sc, and an upper level ECU (Electronic Control Unit) 50. Also, as shown in FIG. 2, the image processing device 1, the sensor group Sc and the upper level ECU 50 can perform communication with one another via a communication bus B of communication protocols of CAN (Control Area Network) communication.

The sensor group Sc includes a variety of sensors configured to detect a traveling state of the vehicle C, and is configured to notify detected sensor values to the image processing device 1. The sensor group Sc includes a vehicle speed sensor configured to detect the number of rotations of a wheel of the vehicle C, a steering angle sensor configured to detect a steering angle of the vehicle C, and the like.

The upper level ECU 50 is an ECU configured to support automatic parking of the vehicle C, for example, and is configured to park the vehicle C in the parking space PS, based on the parking space PS detected by the image processing device 1, for example. For example, the upper level ECU 50 is an EPS (Electric Power Steering)-ECU configured to control the steering angle of the vehicle C, and can control the steering angle relative to the parking space PS detected by the image processing device 1. In the meantime, the upper level ECU 50 may include an ECU configured to perform accelerator control and brake control.

As shown in FIG. 2, the image processing device 1 includes a control unit 2 and a storage 3. The control unit 2 includes a line segment extraction unit 21, an improper area determination unit 22, a delimiting line candidate detection unit 23, an exclusion determination unit 24, a parking space detection unit 25, a parking space managing unit 26, and a stop position determination unit 27.

The control unit 2 includes a computer having, for example, a CPU (Central Processing Unit), a ROM (Read Only Memory), a RAM (Random Access Memory), an HDD (Hard Disk Drive), an I/O port, and the like, and a variety of circuits.

The CPU of the computer is configured to read and execute programs stored in the ROM, thereby functioning as the line segment extraction unit 21, the improper area determination unit 22, the delimiting line candidate detection unit 23, the exclusion determination unit 24, the parking space detection unit 25, the parking space managing unit 26 and the stop position determination unit 27 of the control unit 2.

Also, at least some or all of the line segment extraction unit 21, the improper area determination unit 22, the delimiting line candidate detection unit 23, the exclusion determination unit 24, the parking space detection unit 25, the parking space managing unit 26 and the stop position determination unit 27 of the control unit 2 may be configured by hardware such as an ASIC (Application Specific Integrated Circuit), an FPGA (Field Programmable Gate Array) and the like.

The storage 3 corresponds to a RAM and an HDD, for example. The RAM and the HDD can store therein a variety of information and information of diverse programs. In the meantime, the image processing device 1 may be configured to acquire the programs and diverse information through another computer connected with a wired or wireless network, or a portable recording medium.

When it is assumed that the vehicle C travels in the parking lot (for example, the vehicle speed is lower than 30 km/h), for example, the control unit 2 may execute detection processing of the parking space PS, which will be described later, or may execute the detection processing all during the traveling of the vehicle C.

The line segment extraction unit 21 is configured to detect edge lines connecting edge points based on luminance of each pixel, from the image data input from the vehicle-mounted camera 10. Specifically, the line segment extraction unit 21 converts the image data input from the vehicle-mounted camera 10 into a gray scale image by performing gray scaling for the image data. The gray scaling is processing of converting each pixel of image data so as to express the same with each gradation (for example, 256 gradations) from white to black, in correspondence to luminance.

The line segment extraction unit 21 may obtain an edge strength of each pixel and a luminance gradient by applying a Sobel filter to the gray scale image, for example. Then, the line segment extraction unit 21 may extract the edge points by extracting pixels having edge strength exceeding a predetermined value, and may extract the edge lines by connecting the adjacent edge points. The line segment extraction unit 21 is configured to notify edge information about the extracted edge points and edge lines to the improper area determination unit 22.

The line segment extraction unit 21 is configured to notify, to the improper area determination unit 22, edge information about the edge points and edge lines detected by selectively searching a partial area in the image, based on second area information 32 and third area information 33 (which will be described later) stored in the storage 3.

The improper area determination unit 22 is configured to determine whether there is an improper area in which it is difficult to detect the delimiting line for establishing the parking space, based on the edge points and edge lines extracted by the line segment extraction unit 21. For example, the improper area determination unit 22 may determine, as the improper area, a non-paved road surface area (for example, gravels) and a grating area, in which more edge points are extracted, as compared to a paved road surface.

Specifically, the improper area determination unit 22 may determine, as the improper area, an area in which a density of the respective edge points is equal to or greater than a predetermined value and the luminance gradient of the respective edge points is not uniform. The improper area determination unit 22 is configured to remove edge information about the improper area from the edge information, based on the determined improper area, and to provide the resultant information to later processing.

The delimiting line candidate detection unit 23 is configured to detect the delimiting line candidate, which is a candidate of the delimiting line for delimiting the parking space, based on the edge lines extracted by the line segment extraction unit 21. Specifically, the delimiting line candidate detection unit 23 detects, as the delimiting line candidate, edge lines substantially parallel with each other and having an interval belonging to a predetermined range corresponding to a width of the delimiting line.

That is, the delimiting line candidate detection unit 23 detects, as the delimiting line candidate, edge lines corresponding to left and right ends of each delimiting line in a width direction. The delimiting line candidate detection unit 23 is configured to generate delimiting line information about the detected delimiting line candidates and to notify the same to the exclusion determination unit 24.

In the meantime, the delimiting line candidate detection unit 23 may execute the detection processing of the delimiting line candidate, except the improper area detected by the improper area determination unit 22. In other words, the delimiting line candidate detection unit 23 does not execute the detection processing of the delimiting line candidate for the improper area. Thereby, it may be possible to suppress a processing load of the control unit 2.

The exclusion determination unit 24 is configured to determine whether there is a parking-unavailable area in which the parking of the vehicle C is not permitted, based on the delimiting line candidates detected by the delimiting line candidate detection unit 23. For example, the exclusion determination unit 24 determines whether there is a parking-unavailable area such as a stripe area, as the parking-unavailable area.

Specifically, when the delimiting line candidates substantially parallel with each other are assumed as delimiting lines (referred to as 'support delimiting lines'), if three or more delimiting line candidates inclined to the support delimiting lines are provided with predetermined intervals, the exclusion determination unit 24 regards an area between the support delimiting lines, as a parking-unavailable area.

Also, the exclusion determination unit 24 may determine whether there is a delimiting line candidate, which is not necessary to detect the parking space, such as a road surface marker. For example, the exclusion determination unit 24 may detect each road surface marker included in the image by matching the delimiting line candidate detected by the delimiting line candidate detection unit 23 and a template model of each road surface marker.

The exclusion determination unit 24 is configured to exclude the unnecessary delimiting line candidate from the delimiting line information, to apply the information about the parking-unavailable area to the delimiting line information, and to notify the same to the parking space detection unit 25.

The parking space detection unit 25 is configured to detect the parking spaces, based on the delimiting line candidates detected by the delimiting line candidate detection unit 23. Specifically, the parking space detection unit 25 detects, as the parking space, an area between the delimiting line candidates arranged in parallel with each other with a predetermined interval.

Here, the predetermined interval is a width of a standard parking area for general public defined by laws and the like relating to the parking lot. Also, in this case, the parking space detection unit 25 may detect the parking space while avoiding the area determined as the parking-unavailable area by the exclusion determination unit 24.

That is, the parking space detection unit 25 may detect the parking space while avoiding the stripe area and the like. When the parking space detection unit 25 detects the parking space, it notifies parking space information about the parking space to the parking space managing unit 26. Meanwhile, in the below, the delimiting line candidates detected as the parking space by the parking space detection unit 25 are referred to as 'delimiting lines'. Also, the parking space information includes vertex coordinates of each delimiting line based on the vehicle C.

The parking space managing unit 26 is configured to manage the parking spaces detected by the parking space detection unit 25 in chronical order. The parking space managing unit 26 may estimate a moving amount of the vehicle C on the basis of the sensor values input from the sensor group Sc, and estimate the vertex coordinates of each actual delimiting line based on past parking space information, based on the moving amount.

Also, the parking space managing unit 26 may update coordinate information of the delimiting line in the past parking space information, based on the newly input parking space information. That is, the parking space managing unit 26 is configured to frequently update a relative positional relationship between the vehicle C and the parking space, in association with movement of the vehicle C.

The parking space managing unit 26 is configured to set an area (hereinbelow, also referred to as 'detection area') in which the detection processing of the edge lines is to be executed by the line segment extraction unit 21. For example, when the parking space detection unit 25 detects the delimiting lines from the images to be continuously captured while moving, the parking space managing unit 26 predicts areas, in which the delimiting lines are highly likely to appear in an image to be captured next, based on areas, in which the delimiting lines are detected, of the image.

The parking space managing unit 26 is configured to set the predicted areas, as a detection area, in which edge lines are to be detected by the line segment extraction unit 21, in the image captured next. Thereby, since the line segment extraction unit 21 has only to execute the detection processing of the edge lines only within the detection range predicted and set by the parking space managing unit 26, it may be possible to shorten time necessary for the detection processing of the edge lines. As a result, the image processing device 1 can shorten the processing time required to detect the delimiting lines while maintaining the detection accuracy of the delimiting lines.

Also, the parking space managing unit 26 may set a detection range of the parking space to be newly detected while assuming that a plurality of parking spaces is continuously arranged. For example, the parking space managing unit 26 sets one parking space PS detected by the parking space detection unit 25, as a reference, and assumes that there is a plurality of parking spaces continuously to the parking space.

Then, the parking space managing unit 26 sets a position of the predicted parking space, as a detection area in an image captured next. Thereby, when detecting edge lines configuring a new delimiting line, since the line segment extraction unit 21 has only to execute the detection processing of the edge lines only within the detection area set by the parking space managing unit 26, it may be possible to shorten the time necessary for the detection processing of the edge lines. The configuration and operations of the parking space managing unit 26 will be described later with reference to FIGS. 3 to 6.

The stop position determination unit 27 is configured to determine a stop position upon parking of the vehicle C in the parking space, based on the edge lines detected by the line segment extraction unit 21. For example, the stop position determination unit 27 determines a stop position of the vehicle C by detecting a wheel block, a curbstone, a wall, a white line extending in a vehicle width direction and the like, based on the edge lines detected by the line segment extraction unit 21.

When a wheel block is detected, the stop position determination unit 27 determines a stop position so that rear wheels of the vehicle C are to be located just before the wheel block. When a white line, a wall and the like are detected, instead of the wheel block, the stop position determination unit 27 determines a stop position so that a rear end (for example, a tip end of a rear bumper) of the vehicle C is to be located just before the white line.

Figure 3:
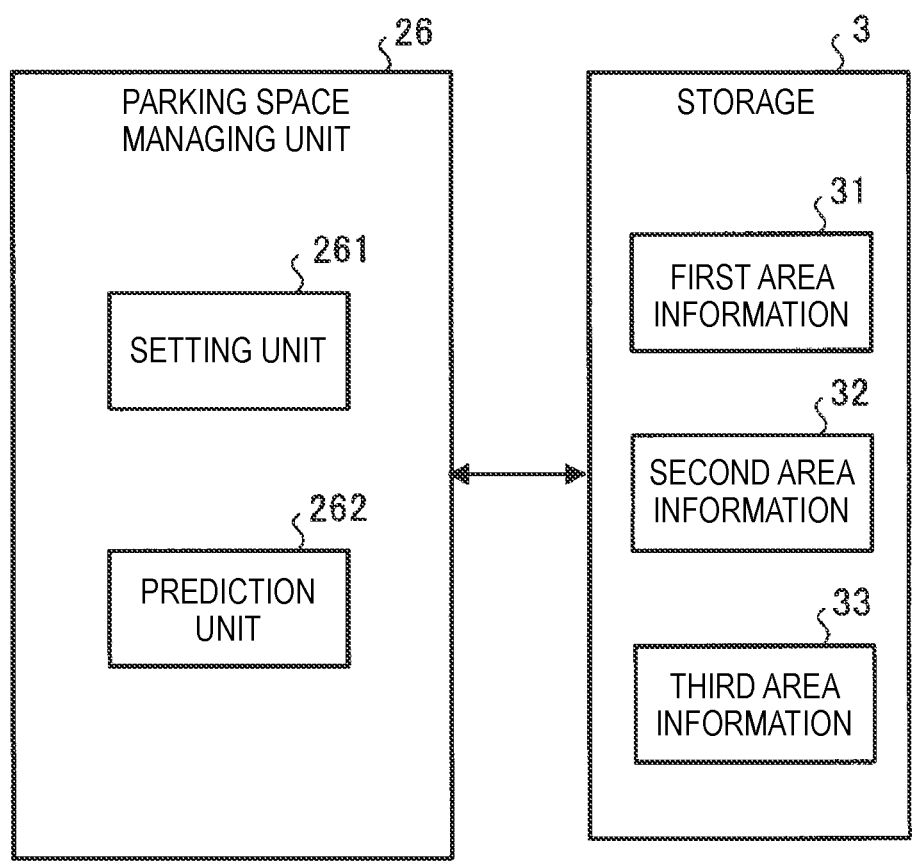
FIG. 3 is a block diagram of a parking space managing unit.
Figure 4A:
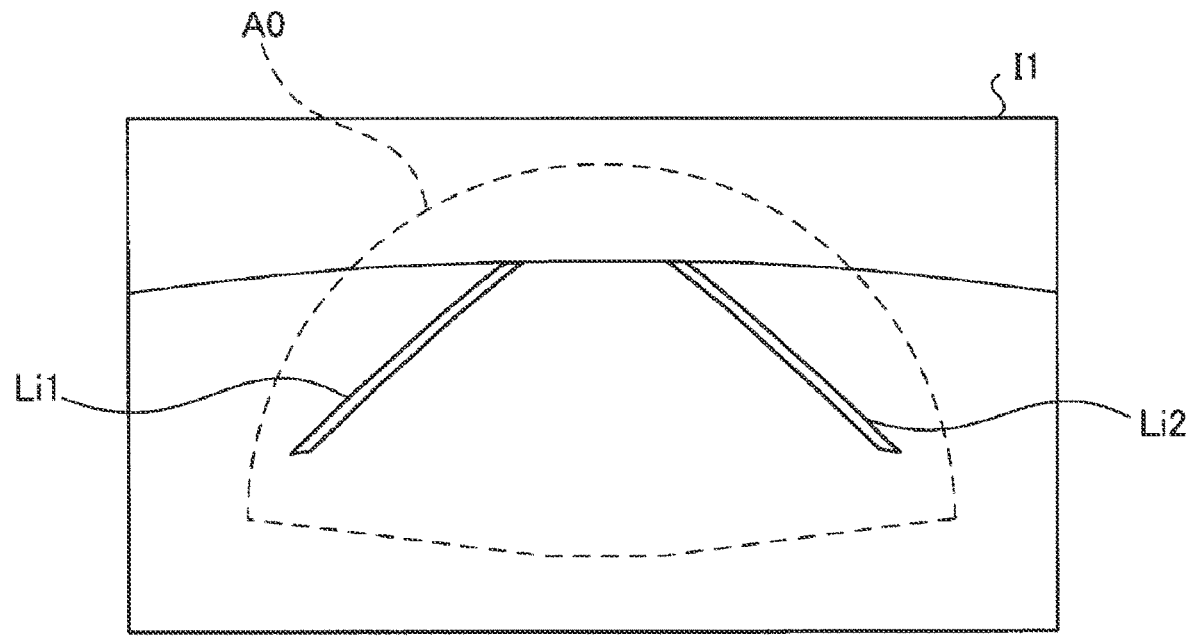
FIG. 4A illustrates a setting sequence of a first area.
Figure 4B:
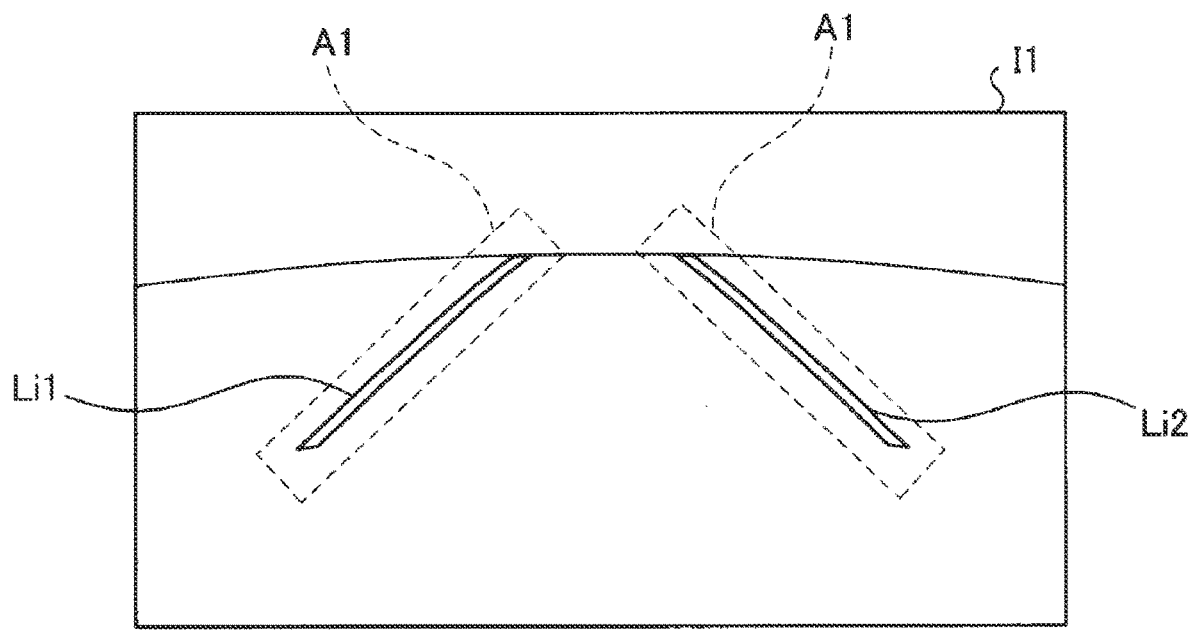
FIG. 4B illustrates the setting sequence of the first area.
Figure 5:
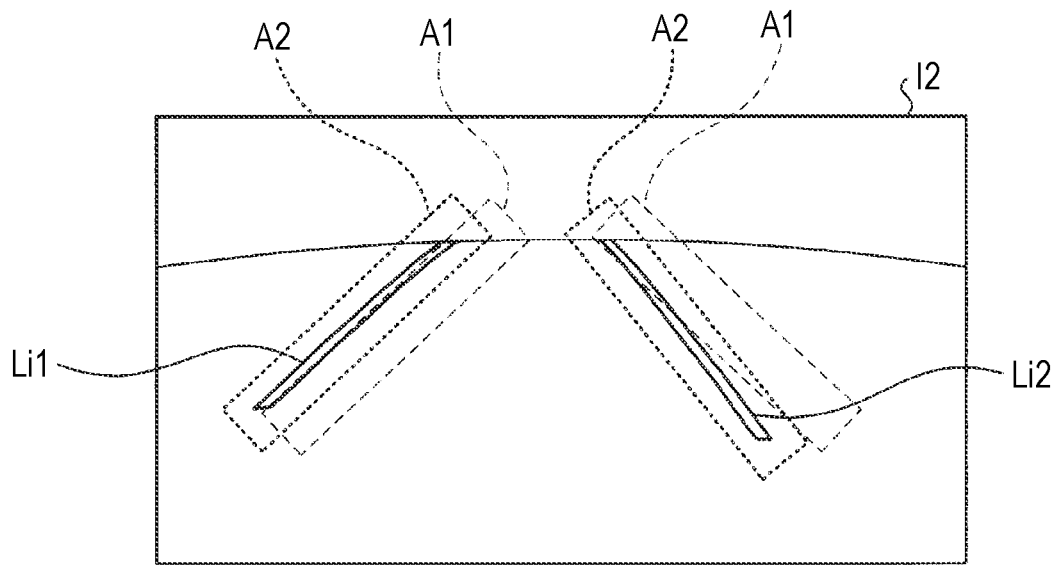
FIG. 5 illustrates a setting sequence of a second area.
Figure 6:
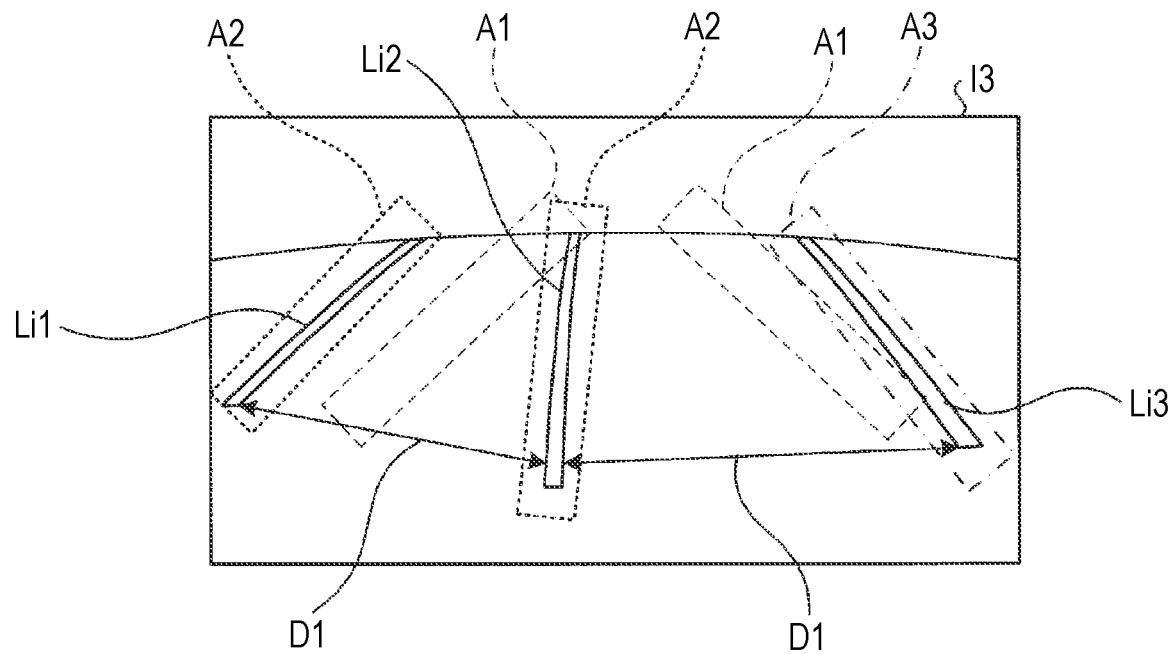
FIG. 6 illustrates a setting sequence of a third area.

Subsequently, the parking space managing unit 26 according to the exemplary embodiment is described in detail with reference to FIGS. 3 to 6. FIG. 3 is a block diagram of the parking space managing unit 26. FIGS. 4A and 4B illustrate a setting sequence of a first area. FIG. 5 illustrates a setting sequence of a second area. FIG. 6 illustrates a setting sequence of a third area.

Meanwhile, FIG. 3 selectively depicts a configuration of setting a detection area, in which edge lines are to be detected by the line segment extraction unit 21, of the configurations of the parking space managing unit 26, and the other configurations are not shown.

As shown in FIG. 3, the parking space managing unit 26 includes a setting unit 261, and a prediction unit 262. The setting unit 261 is a processing unit configured to set areas, in which delimiting lines for delimiting a parking space in a first image of a plurality of images to be continuously captured while moving are detected, as first areas.

Also, the prediction unit 262 is a processing unit configured to predict second areas, in which the delimiting lines are to be detected in a second image to be captured later in time than the first image of the plurality of images to be continuously captured, based on the first areas.

Also, in the storage 3, first area information 31, second area information 32, and third area information 33 are stored. The first area information 31 is information indicative of positions of the first areas in the first image, which are set by the setting unit 261 and are registered in the storage 3. The second area information 32 and the third area information 33 are information indicative of positions of the second areas and a third area (which will be described later) in each second image, which are predicted by the prediction unit 262 and are registered in the storage 3.

Here, as described above, since a wide-angle lens is adopted for the vehicle-mounted camera 10, a resolution is higher at a position closer to a center of an image to be captured, and the resolution is lowered and coarser away from the center of the image. For this reason, as shown in FIG. 4A, when the detection of delimiting lines starts, the setting unit 261 first sets a central high-resolution area A0 in the first image I1, as the detection area. That is, the setting unit 261 sets the central high-resolution area A0 in the first image I1, as a target area, an attention area or an ROI (Region Of Interest).

In this instance, the delimiting lines Li1 and Li2 have not been detected yet. For this reason, the first area information 31, the second area information 32, and the third area information 33 have not been registered in the storage 3. This state is a state in which the high-resolution area A0 is set as the detection area.

When a traveling speed of the vehicle C is 30 Km/h or lower and the detection of delimiting lines starts, for example, the setting unit 261 sets the high-resolution area A0 as the detection area by resetting the first area information 31, the second area information 32, and the third area information 33 registered in the storage 3.

Also, even when the vehicle C traveling in the parking lot turns and thus the delimiting lines, which have been detected until then, are not detected, for example, the setting unit 261 sets the high-resolution area A0 as the detection area by resetting the first area information 31, the second area information 32, and the third area information 33.

In the case in which the first area information 31, the second area information 32, and the third area information 33 are not registered in the storage 3, i.e., the high-resolution area A0 is set as the detection area, the line segment extraction unit 21 searches the high-resolution area A0 and extracts edge lines from the first image I1. Thereby, the parking space detection unit 25 can detect the delimiting lines Li1 and Li2 with high accuracy from the edge lines detected from the high-resolution area A0.

Subsequently, as shown in FIG. 4B, the setting unit 261 sets, as the first areas A1, areas (refer to the broken line) including the areas of the first image I1, in which the delimiting lines Li1 and Li2 are detected, and registers the first area information 31, which indicates positions of the first areas A1 in the first image I1, in the storage 3.

The first area information 31 is held in the storage 3 until it is reset by the setting unit 261. That is, the setting unit 261 sets the first areas A1 of which positions in the first image I1 are fixed.

Like this, when the delimiting lines Li1 and Li2 are detected in a state in which there is no first area being set, the setting unit 261 sets, as the first areas, the areas in which the delimiting lines Li1 and Li2 are detected. Thereby, when the detection of delimiting lines starts, the setting unit 261 can set, as the first areas, correct areas in which the delimiting lines Li1 and Li2 are first detected each time.

Then, as shown in FIGS. 5 and 6, the prediction unit 262 predicts the second areas A2, in which the delimiting lines Li1 and Li2 are detected in a plurality of second images 12, 13 captured later in time than the first image I1, based on the first areas A1.

For example, in a case in which a left side of the vehicle C is captured by the vehicle-mounted camera 10, when the vehicle C travels forward, the delimiting lines Li1 and Li2 appear at the left of the first areas A1, in which the delimiting lines Li1 and Li2 are detected in the first image I1, in the second image 12, as shown in FIG. 5.

Therefore, the prediction unit 262 sets, as the second areas A2, areas (refer to the dotted lines) in which the delimiting lines Li1 and Li2 are highly likely to appear in the second image 12, based on the positions of the first areas A1, and registers the second area information 32, which indicates positions of the second areas A2, in the storage 3.

At this time, the prediction unit 262 sets the second areas A2 in the second image 12, based on the positions of the first areas A1 in the first image I1, a moving amount to be calculated from the traveling speed of the vehicle C, a steering angle, and distortion of the image due to the wide angle lens.

For this reason, the line segment extraction unit 21 searches only the second areas A2 to detect the edge lines, without searching an area except the second areas A2 in the second image 12. Then, the parking space detection unit 25 detects the delimiting lines Li1 and Li2 from the edge lines detected from the second areas A2. Thereby, the image processing device 1 can shorten the processing time required to detect the delimiting lines Li1 and Li2 while maintaining the detection accuracy of the delimiting lines Li1 and Li2.

Also, as shown in FIG. 6, the prediction unit 262 sets, as the second areas A2, areas (refer to the dotted lines), in which the delimiting lines Li1 and Li2 are highly likely to appear in the second image 13 captured subsequently to the second image 12 shown in FIG. 5. Then, the prediction unit 262 registers the second area information 32, which indicates positions of the second areas A2, in the storage 3.

Thereby, like the case of the second image 12 shown in FIG. 5, the image processing device 1 can shorten the processing time required to detect the delimiting lines Li1 and Li2 while maintaining the detection accuracy of the delimiting lines Li1 and Li2.

In the meantime, when the delimiting lines Li1 and Li2 are detected in the second areas A2, the prediction unit 262 may set, as the second areas A2, areas in which the delimiting lines Li1 and Li2 are highly likely to appear in a second image to be captured next, based on the positions of the detected latest delimiting lines.

According to this configuration, since the second areas in the second image to be captured next are always set on the basis of the latest delimiting lines, it may be possible to set the second areas A2 with higher accuracy, and to further improve the detection accuracy of the delimiting lines Li1 and Li2.

Also, the prediction unit 262 predicts the second areas A2 of which positions in the second images 12, 13 vary, based on the first areas A1 of which positions are fixed, for each of the plurality of second images 12, 13. Like this, since the positions of the first areas A1 as a reference are fixed, the prediction unit 262 can predict the second areas A2, which vary in the plurality of second images 12, 13, by the simply processing.

Also, when the vehicle C continues to travel, a new delimiting line Li3 may appear in the second image 13, in addition to the delimiting lines Li1 and Li2 detected until then, as shown in FIG. 6. Therefore, the prediction unit 262 predicts a third area A3, in which the new delimiting line Li3 is to be detected, based on an interval D1 between the detected delimiting lines Li1 and Li2.

At this time, the prediction unit 262 assumes that the delimiting line Li3 to be newly detected is provided with the same interval as the interval D1 between the pair of detected delimiting lines Li1 and Li2. The prediction unit 262 predicts that the new delimiting line Li3 will appear at a position spaced with the interval D1 from the detected delimiting line Li2 in the second image 13, based on the distortion due to the wide angle lens, and sets an area shown with the dashed-dotted line, as the third area A3. Then, the prediction unit 262 registers the third area information 33, which indicates a position of the third area A3, in the storage 3.

In the case in which the third area information 33 is registered in the storage 3, the line segment extraction unit 21 searches the third area A3, in addition to the second area A2, and detects the edge lines. Then, the parking space detection unit 25 detects the new delimiting line Li3 from the edge lines detected from the third area A3. Thereby, the image processing device 1 can shorten the processing time required to detect the new delimiting line Li3 while maintaining the detection accuracy, like the delimiting lines Li1 and Li2.

Thereafter, when the vehicle C turns, for example, the prediction unit 262 cannot correctly predict the areas in which the delimiting lines Li1, Li2 and Li3 are to be detected, through the prediction based on the first area A1.

Therefore, when the vehicle C turns, the setting unit 261 resets the first area information 31, the second area information 32, and the third area information 33 registered in the storage 3. Thereby, the state in which the high-resolution area A0 is set as the detection area is made.

For this reason, the line segment extraction unit 21 detects the edge lines from the high-resolution area A0, for an image to be captured next. Then, the parking space detection unit 25 detects the delimiting lines from the edge lines detected from the high-resolution area A0. Thereby, even after the vehicle C turns, the image processing device 1 can maintain the detection accuracy of the delimiting lines.

Figure 7:
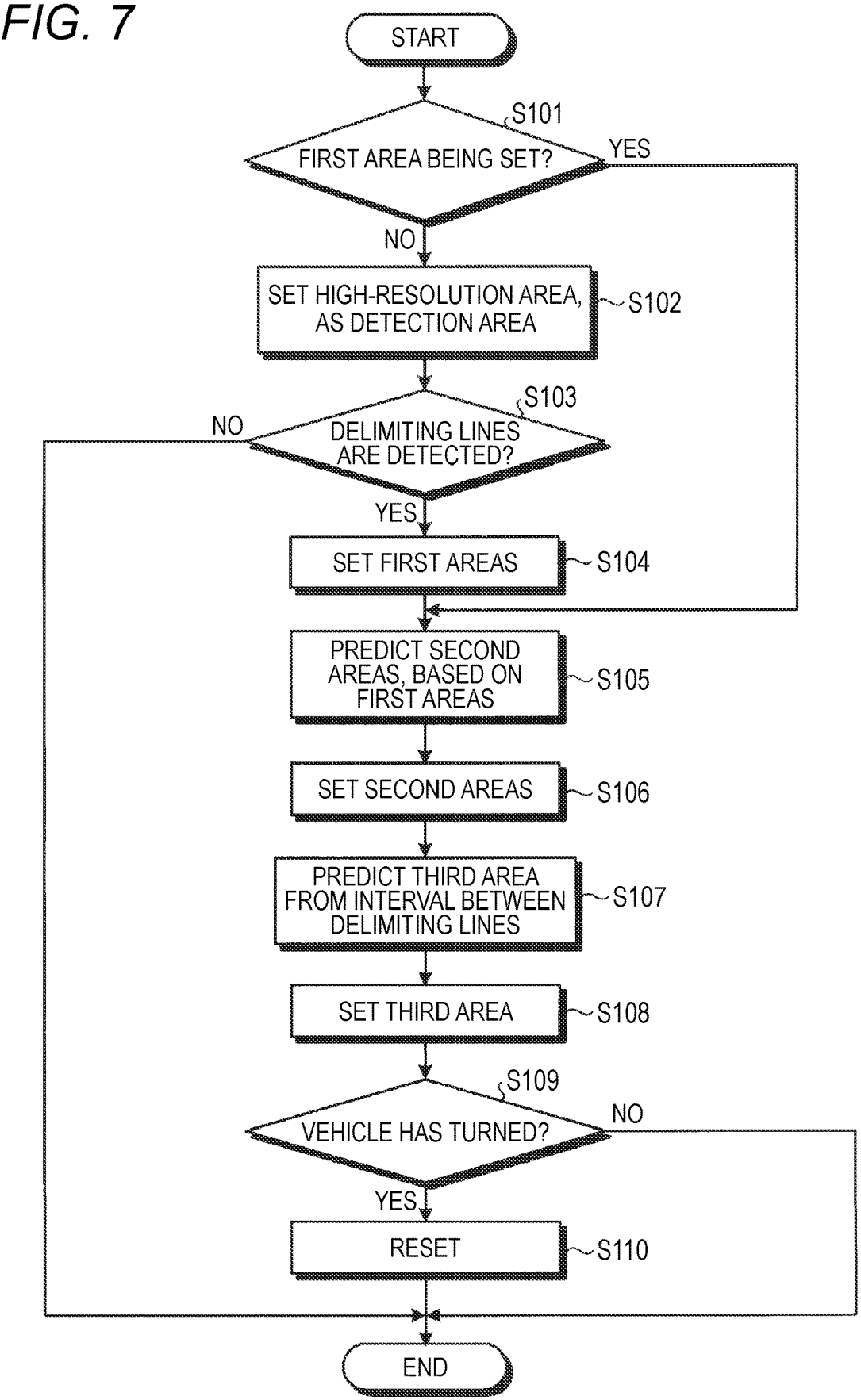
FIG. 7 is a flowchart depicting an example of processing that is to be executed by the parking space managing unit.

Subsequently, processing that is to be executed by the parking space managing unit 26 is described with reference to FIG. 7. FIG. 7 is a flowchart depicting an example of processing that is to be executed by the parking space managing unit 26. When it is assumed that the vehicle C travels in the parking lot (for example, the vehicle speed is lower than 30 km/h), for example, the parking space managing unit 26 repeatedly executes the processing shown in FIG. 7.

Specifically, as shown in FIG. 7, the parking space managing unit 26 first determines whether there is a first area being set (step S101). When it is determined that there is a first area (step S101, Yes), the parking space managing unit 26 proceeds to step S105.

When it is determined that there is no first area being set (step S101, No), the parking space managing unit 26 sets the high-resolution area as the detection area (step S102), and determines whether the delimiting lines are detected (step S103).

When it is determined that the delimiting lines are not detected (step S103, No), the parking space managing unit 26 ends the processing, and starts the processing from step S101, for an image captured next.

Also, when it is determined that the delimiting lines are detected (step S103, Yes), the parking space managing unit 26 sets, as the first areas, areas including the areas in which the delimiting lines are detected (step S104). Thereafter, the parking space managing unit 26 predicts the second areas, based on the first areas (step S105), and sets the predicted second areas (step S106).

Subsequently, the parking space managing unit 26 predicts a third area, from an interval between the detected delimiting lines (step S107), and sets the third area (step S108). In the meantime, when only one delimiting line is detected and an interval between delimiting lines cannot be detected, the parking space managing unit 26 does not set the third area. Thereafter, the parking space managing unit 26 determines whether the vehicle C has turned (step S109).

When it is determined that the vehicle C has not turned (step S109, No), the parking space managing unit 26 ends the processing, and starts the processing from step S101, for an image captured next. Also, when it is determined that the vehicle C has turned (step S109, Yes), the parking space managing unit 26 resets the first area information 31, the second area information 32, and the third area information 33 registered in the storage 3 (step S110), ends the processing, and starts the processing from step S101, for an image captured next.

The additional effects and modified embodiments may be easily deduced by one skilled in the art. For this reason, the wider aspect of the present disclosure is not limited to the specific details and exemplary embodiments as described above. Therefore, a variety of changes can be made without departing from the spirit and scope of the concept of the general invention defined by the claims and equivalents thereof.

What is claimed is:

1. An image processing device comprising:
    a computer having a hardware processor configured to:
    set an area, as a first area, in which at least one delimiting line for delimiting a parking space has been detected in a first image of a plurality of images continuously captured while an imaging device that captures the images is moving;
    predict, based on the first area, a second area in which the at least one delimiting line is expected to be detected in at least one second image of the plurality of images, the at least one second image being captured later in time than the first image; and
    predict a third area in which a new delimiting line is expected to be detected in the at least one second image, based on an interval between a plurality of the delimiting lines that have been previously detected, the new delimiting line being different from the previously detected delimiting lines.

2. The image processing device according to claim 1, wherein
    a position of the first area in the first image is fixed, and
    positions of the second area varies within a plurality of the second images that are sequentially captured later in time than the first image.

3. The image processing device according to claim 2, wherein
    when a vehicle on which the imaging device is mounted turns, the hardware processor resets the first area being set.

4. The image processing device according to claim 3, wherein,
    when the at least one delimiting line is detected in a state where the first area has not been set, the hardware processor sets, as the first area, the area in which the at least one delimiting line is detected.

5. The image processing device according to claim 2, wherein,
    when the at least one delimiting line is detected in a state where the first area has not been set, the hardware processor sets, as the first area, the area in which the at least one delimiting line is detected.

6. The image processing device according to claim 2, wherein the hardware processor is further configured to
    detect the at least one delimiting line by searching a high-resolution area having a higher resolution than other areas in the first image, and detect the at least one delimiting line in the at least one second image by searching only the second area in the at least one second image.

7. The image processing device according to claim 1, wherein
    the hardware processor is configured to predict, based on a position of the at least one delimiting line detected in the second area, the second area in another second image captured later in time than the second image in which the at least one delimiting line in the second area has been detected.

8. The image processing device according to claim 7, wherein
    when a vehicle on which the imaging device is mounted turns, the hardware processor resets the first area being set.

9. The image processing device according to claim 8, wherein,
    when the at least one delimiting line is detected in a state where the first area has not been set, the hardware processor sets, as the first area, the area in which the at least one delimiting line is detected.

10. The image processing device according to claim 7, wherein,
  when the at least one delimiting line is detected in a state where the first area has not been set, the hardware processor sets, as the first area, the area in which the at least one delimiting line is detected.

11. The image processing device according to claim 7, wherein the hardware processor is further configured to
  detect the at least one delimiting line by searching a high-resolution area having a higher resolution than other areas in the first image, and detect the at least one delimiting line in the at least one second image by searching only the second area in the at least one second image.

12. The image processing device according to claim 1, wherein
  when a vehicle on which the imaging device is mounted turns, the hardware processor resets the first area being set.

13. The image processing device according to claim 12, wherein,
  when the at least one delimiting line is detected in a state where the first area has not been set, the hardware processor sets, as the first area, the area in which the at least one delimiting line is detected.

14. The image processing device according to claim 1, wherein,
  when the at least one delimiting line is detected in a state where the first area has not been set, hardware processor sets, as the first area, the area in which the at least one delimiting line is detected.

15. The image processing device according to claim 1, wherein the hardware processor is further configured to
  detect the at least one delimiting line by searching a high-resolution area having a higher resolution than other areas in the first image, and detect the at least one delimiting line in the at least one second image by searching only the second area in the at least one second image.

16. An image processing method performed by a hardware processor of a computer, the method comprising:
  setting, as first areas, areas in which delimiting lines for delimiting a parking space have been detected in a first image of a plurality of images continuously captured while an imaging device that captures the images is moving;
  predicting second areas, in which the delimiting lines are expected to be detected in a second image to be captured later in time than the first image of the plurality of images, based on the first areas; and
  predicting a third area in which a new delimiting line is expected to be detected in the second image, based on an interval between a plurality of the delimiting lines that have been previously detected, the new delimiting line being different from the previously detected delimiting lines.

\* \* \* \* \*